Patented Dec. 9, 1924.

1,518,566

UNITED STATES PATENT OFFICE.

ALFRED HUTCHINSON COWLES, OF SEWAREN, NEW JERSEY, ASSIGNOR TO THE ELECTRIC SMELTING AND ALUMINUM CO., OF CLEVELAND, OHIO, A CORPORATION OF OHIO.

FERTILIZER.

No Drawing.     Application filed December 28, 1918. Serial No. 268,674.

*To all whom it may concern:*

Be it known that I, ALFRED H. COWLES, a citizen of the United States, and a resident of Sewaren, in the county of Middlesex and State of New Jersey, have invented certain new and useful Improvements in Fertilizers, of which the following is a specification.

My invention relates to fertilizers, and is a continuation in part of my application Serial No. 192,028, filed September 10, 1917.

At the present time, soils from the decomposition of plants and manures are known to contain hydrated silica, also artificial mixtures of fertilizers, in many instances, contain it in indefinite amounts as an accidental impurity. Liebig, as early as 1840, from his investigations of the composition of the ashes of various plants, thought silica necessary as a plant food. This resulted in experiments with potassium and sodium silicates to supply silica to augment the growth of grasses, cereals and plants containing very large percentages of silica in their skeletons.

Knop and other plant physiologists, succeeded in growing plants with silica supposed to be absent as a nutriment, and afterwards, when the "Law of the minimum" was proven and accepted, silica in any form was eliminated by agricultural chemists as an essential element to use in artificial mineral fertilizers. ("Soil conditions and plant growth," by E. J. Russell, 1915 Edition, pp. 30, 46, 142.)

It is now universally assumed that silica, clay, zeolites and feldspars in soils, furnish a superabundance of silica and therefore its addition as a fertilizer is unnecessary. These substances and natural silicates are so minutely soluble that the assumption is unwarranted. By annual repeated growths of vegetation upon uncultivated land, hydrated double silicates, while slowly degrading to clay, furnish to soil waters soluble silica. This accumulates and is held by zeolites, vegetation and humus, and in time, an abundance of the same is in such soils and furnishes normal amounts to successive growths. Cultivation with exhaustion of humus and annual removal of crops, exhausts the soil faster than it is replenished. Figuratively, the sponge has been removed that has accumulated and retained in sufficient amount this material which forms a large part of the natural skeletons of plants. Cultivation also accelerates this loss through facilitating sub-soil drainage. Thus it is that soil water solutions in soils on cultivated lands largely free from humus, have become deficient in the quantity of soluble silica that is needed for maximum plant growth; therefore:

My invention consists in designingly using variable proportions of hydrated silica containing more than fifteen (15) per cent. of water of hydration obtained from calcium silicates containing molecular ratios ranging from $2\frac{1}{2}:1$ to $0.70:1$ calcium oxide to silica, to supply deficiencies of soluble silica required for plant growth. Such silica containing various amounts of water is securable by the action of carbonic and other acids and moisture upon various simple and complex silicates, artificial or natural.

It further consists in the intentional addition or formation of designed proportions of such silicates in the preparation of fertilizer mixtures or substances, either by addition of such hydrated silica or such silicates and an acid, with the intentional design of increasing or supplying intended amounts of hydrated silica to such mixtures. My invention or discovery further embodies adding to soils, simple or complex calcium silicates artificially prepared, characterized in that carbonic acid of the soil waters will decompose said compounds or mixtures with a liberation of hydrated silica of a more soluble type than those hydrated silicas that commonly occur in nature as minerals. The presence of the other essential fertilizers such as potash, iron oxide, phosphoric acid and soda as impurities in said complex silicates, is not to be avoided when there is a proper allowance of calcium oxide to silica in the mixture, so that upon the action of carbonic acid and moisture, there shall be formed a large amount of hydrated silica by their decomposition when used.

In my invention any silicate may be used in any manner so as to supply to the soil or fertilizer mixtures, designed amounts of available added soluble silica. There are certain silicates and mixtures of silicates that can be artificially prepared that will furnish a cheap source of soluble silica. To make my invention clear as to the use of hydrated silica from these specific materials, I explain how to form them and the reason for their use.

Many suggestions have been made involving the fusion of lime with native potash minerals such as occur in granites or potash schists and green-sand marls, with a view to render available the potash therein for fertilizer purposes. In such attempts, it was thought necessary to use potash minerals of high potash content and only sufficient lime to displace the molecular weight proportions of potassa that were in the constitution of the potash silicates therein. It is now thought that such processes are valueless. In these attempts, the product secured from, for instance, potash feldspar and lime, the design was to lock the lime in the form of an insoluble mono-calcium-aluminum-silicate, freeing the potassa ($K_2O$) for solution. It was not realized that impure feldspars and other potash mineral silicates mixed with free silica, can be treated preferably at just their sintering temperature after mixing with two or up to two and one-half molecular weight proportions of lime to each single molecular weight proportion of silica in the mixture, and that after such treatment, the action of carbonic acid and moisture on the product, will cause the alkali aluminate necessarily formed to decompose with liberation of potassium carbonate, and also will decompose all excess of di-calcium-silicate, with the liberation of soluble calcium bicarbonate and hydrated silica. The residue left after long soil leaching, will, for example, be a calcium potassium zeolite containing in its constitution a variable fraction of a molecule of calcium oxide and a variable fraction of a molecule of potassium oxide (ammonium and other alkali metal oxides may form a part of this fraction) one molecule of alumina and ultimately two molecules of silica together with water of chemical combination, the quantity of which inversely varies to a marked degree with temperatures to which soil waters are naturally subjected. These substances are the hydrated feldspars or zeolites of nature. They are permutites, and when immersed in a mixed solution, like soil waters, they reciprocally exchange, especially alkali earth metal oxides and alkali metal oxides, inclusive of ammonia. These exchanges are governed by the laws of mass action as bearing upon the action of various ions, with variations of temperatures and variations of the density of different solutes. Zeolites are recognized as valuable soil constituents.

Further, as a part of my invention, is the process of manufacturing the product described which consists in treating in suitable furnaces, potash bearing silicious rocks, such as granites, schists, glauconite marls and others, or mixtures thereof, all containing large amounts of free silica, with two or two and a fraction molecular weight proportions of lime or limestone for each single molecular weight proportion of silica in said mixture, and heating it to a temperature not high enough to materially drive away the potash content and securing a product to be disintegrated or powdered, and the designed and quantitative use of such as a fertilizer. In this process, iron oxide present in the mixture is beneficial both because of its fertilizer value and because by its use, a lower temperature suffices for complete sintering or fusion.

The reasons, though not vital, for this excess of lime over the 2 to 1 ratio of lime to silica are: First to supply one molecular weight proportion of lime to each molecular weight proportion of alumina in the mixture, thus preventing a small amount of silica from becoming insoluble through its forming with alumina, kaolinite ($Al_2O_3 \cdot 2SiO_2 x H_2O$). Second, under conditions of imperfect mixing, an excess insures enough lime present in all parts of the charge so that at least two molecular weight proportions of calcium oxide can combine with one molecular weight proportion of silica ($SiO_2$), thus enabling all the potassa to assume a soluble form as mono-potassium-aluminate. An excess of lime to silica over the $2\frac{1}{2}:1$ ratio leads to higher melting point mixtures and possible volatilization of the potassa.

In the foregoing, I have mentioned the use, in a mixture designed to sinter, of two molecular weight proportions of lime or calcium carbonate to each single molecular weight proportion of silica. In this case, after treatment with $CO_2$, such alumina as may be present in the mixture is left free as hydrated alumina and it naturally enters into combination with hydrated silica to form hydrated alumina silicates ($Al_2O_3 \cdot 2SiO_2 x H_2O$) or the insoluble clay substances of soils. In doing this, however, lime adheres naturally to the compound and some alkali metal oxide, therefore, if a slight excess of lime over and above the two molecules of $CaO$ to one of $SiO_2$ be employed in the mixture, and if the mixture be well sintered the alkali metal oxides will be freed during leaching with greater facility; and it may be supplied in excess even to the extent of an added molecular weight proportion of lime to each single molecular weight proportion of alumina in the total mixture. The tri-calcium silicate is too refractory for good economical working.

(As bearing upon the chemistry of forming a proper mixture for sintering, see my pending application, Serial No. 62,486, filed November 20th, 1915.)

My invention can also be carried out by employing sintered or fused mixtures of lime and silica or compounds of lime and silica preferably lower in their ratio of lime to silica than two and one-half molecular weight proportions of lime to one of silica. In forming these mixtures of compounds, magnesium carbonate, iron oxide and potash as impurities in the lime stone or silica are advantageous. Such mixtures can be formed in a rotary or other suitable furnace and by well known means, disintegrated to powders or mineral wool. So formed, it always contains a little alkali, iron oxide and alumina as impurities. When calcium silicates are used, it is desirable to have them as low in lime content and high in silica content, as is consistent with the economical fusion or sintering and decomposition, when finely divided, by the action of carbonic acid and moisture. Economical methods of producing them are well known. Tri-calcium silicate sinters at too high a temperature and furnishes less hydarted silica, therefore, I would not recommend its use, though it will decompose by the action of carbonic acid and moisture and furnish soluble silica to the soil. The mixture of lime and silica that melts at the lowest temperature, contains a little less than one molecular weight proportion of calcium oxide to one of silica; .70 of molecule of lime to 1 of silica works well. With two low an amount of lime in the mixture, it ceases to be acted upon by carbonic acid and moisture, and the use of such should be avoided.

Hydrated calcium silicates can be produced by treating infusorial earth, best when high in water of chemical combination, with slacked lime at ordinary temperatures. Infusorial earth may contain as high as thirteen per cent of water. This reaction does not take place with ground crystalline silica, thus native hydrated silica may, by treating with slacked lime and water, produce calcium silicates suitable for use.

If the described more soluble types of hydrated silica, or the utilizable calcium silicates, be added to a soil devoid of any one of the other essential mineral fertilizer salts, no valuable results would be expected. In most soils these other essential salts occur in greater or smaller amounts. When calcium silicate is added, there is formed calcium bicarbonate in the waters of the soil. It is known that calcium bicarbonate acting on hydrated silicates containing potassium oxide and alumina, will liberate potassium oxide to form bicarbonate of potassium, and, therefore, the lime performs a double function of supplying lime to the soil waters and also soluble potassium salts. While the foregoing is known, one must conclude that the acid properties of silicic acid tend to release phosphoric acid from its insoluble combination in the soil, thus also performing a double function. For maximum growth of plans, deficiencies in all essential mineral fertilizers below that which is required for their full growths should be supplied to their soil waters in soluble form.

I have made comparative plant growth experiments using chemically equivalent calcium oxide (CaO) proportions in calcium silicate, calcium carbonate, calcium hydrate, calcium carbonate plus hydrated silica mixed therewith, and calcium hydrate plus hydrated silica in mixture, in soils both completely and partially devoid of lime, and found that in those cases where I was supplying hydrated silica to the soil, even as low as one quarter of a ton to the acre, such supply has greatly augmented the growth and luxuriance of nearly all the many plants submitted to competitive tests. These experiments have been performed both in pots and on plots of land, and with each plant, repeated comparative experiments have been made, and in many cases repeated several times. The aggregate result of this work has proven that silica in soluble form is needed to make up that deficiency that exists in all soils that have been submitted to long cultivation.

I find this also true when I supply lime, silica and potash secured by taking a low grade potash feldspar, potash mica or mixtures of the like with silica, that has been sintered with lime to furnish the two plus molecular weight proportions of lime to each single molecular weight proportion of silica in the mixture. Experiments with such a sinter, I have carried on parallel with those that have been mentioned above, and the same show, in many cases, an improvement over using the proper proportioned amount of calcium silicate or lime plus silica. I, therefore, have discovered that low grade potash containing rocks can, if properly sintered or melted with lime (or limestone) be made to give up to the soil waters, hydrated silica with potassa $K_2O$ and most of the lime employed, whilst a part of the lime will remain to form a calcium zeolite (or the like) with a relatively lower amount of contained silica than is in any of the pure double silicate minerals of said rocks from which such zeolite or permutite materials will slowly form, by action of carbonic acid and water. I consider this of great importance. Heretofore, all efforts have been in the direction of utilizing only potassa ($K_2O$) from minerals containing it. High grade minerals in potassium oxide in this case are required. The proper proportioning of lime to silica has never been appreciated in these old attempts to produce fertlizers from such rocks and mineral mixtures.

Deficient soils may be improved as to their hydrated silica content by subjecting calcium silicates containing variable amounts of alkali metal oxide and alumina, the silicates having a ratio of lime to silica of two and a fraction lime to one of silica, to the action of carbonic acid and water.

Proper fineness of the materials I have mentioned when applied to the soil, can be easily appreciated by all those skilled in the art, and such fineness of division was carefully observed in using the mixtures mentioned in the competitive plant growth experiments already described. A fineness of 80 mesh is favorable to good results.

I disclaim the use of soluble alkali metal silicates for application to the soil or to add to fertilizer mixtures as a source of supply of soluble silica. Plant growth experiments, long ago abandoned, made with them, have led plant physiologists into the error of considering the soluble types of silica as non-essential in the fertilization of plants. These old experiments failed for a chemical reason that has not been recognized in this art, namely: all soils, fertilized or not, that are suitable for plant growth, must contain calcium bi-carbonate or a salt of calcium. The action of soluble alkali silicates when in solution and brought in contact with calcium salts, leads to the formation of insoluble compounds formed of lime, alkali metal oxide and silica. When these old experiments were made, as there was always employed an excess of lime, or lime salt, above that necessary to form this insoluble product, such insoluble salts formed. Therefore, when the experimenters thought they were furnishing soluble silica to the soil water, this silica was being immediately precipitated out and so rendered non-available to their plants. The deductions drawn from their experiments were, therefore, misleading. These deductions have found their way into the literature of this art. Locking up of the silica occurs even with clay present, or with zeolites in the soil, when soluble alkali silicates are used. The silica enters into combination to replace silica that has formerly been leached away from zeolites during their slow process of degradation to clay. From these causes, the old comparative plant growth experiments failed to show the value of silica hydrates. This should have been recognized from the art relating to the manufacture of artificial stone from alkali silicates or water glass and said lime compounds. Also from the work performed by Daubree, T. Sterry Hunt and others on the reaction of alkali silicates in the artificial formation of insoluble minerals. I disclaim the use of natural mono-calcium silicates, such as Wollastonite, and corresponding mono-magnesium silicates, such as Enstatite, since they are too rare in nature to form the basis of any commercial process and have only been the subject of scientific experiments.

In my application Serial No. 192,028, filed September 18, 1917, claims are made broadly to the feature of adding soluble calcium compounds described herein to fertilizer compositions.

Having thus fully set forth my invention and the manner in which it is to be carried out, what I claim is:—

1. The process of forming a fertilizer which comprises heating a silicate containing potassium oxide and alumina with two and a fraction molecules of lime for each molecule of silica thereby forming a product largely decomposable by the action of water and carbonic acid and liberating hydrated silica containing more than fifteen percent of water of hydration and adding the resulting product to fertilizers deficient in soluble silica and lime.

2. The process of increasing the amount of hydrated silica and lime that may exist in the soil, which comprises adding to a mixture of fertilizer materials a sintered calcium silicate containing two and a fraction molecules of lime to one of silica and adapted to be decomposed by carbonic acid and moisture into carbonate of calcium and hydrated silica containing more than fifteen per cent of water of hydration.

3. A fertilizer for supplying lime and hydrated silica, the latter containing more than fifteen per cent of water of hydration, composed of a calcium silicate combined with alkali metal oxide and alumina, the molecular ratio of lime to silica being two and a fraction to one.

4. A fertilizer material composed of artificial calcium silicate containing alkali and alumina, the molecular ratio of calcium oxide to silica being two and a fraction to one.

5. The process of fertilization, which comprises subjecting the soil to a fertilizer composed of artificial calcium silicate, the artificial silicate containing the ratio of calcium oxide to silica varying between two and a fraction to one and seven-tenths to one.

6. The method of supplying to deficient soils hydrated silica containing more than fifteen per cent of water of hydration, which comprises subjecting to carbonic acid and moisture calcium silicates containing variable percentages of alkali metal oxide and alumina, said silicates having a molecular ratio of calcium oxide to silica of two and a fraction to one, and adding the same to a fertilizer mixture.

7. A fertilizer composed of artificially prepared calcium silicate having the molecular ratio of two and a fraction molecules of calcium oxide to one of silica.

8. A fertilizer composed of artificially prepared calcium silicate of lower calcium value than the tri-calcium and containing impurities such as zeolite material and iron oxide.

9. The method of producing a fertilizer or fertilizer component, which comprises sintering silicious rocks containing potash, with lime in such proportions as to form calcium silicate of higher value than dicalium and less than tri-calcium containing a quantity of potassium aluminate, the resulting compound being adapted to be decomposed and liberate to the soil potash, lime and hydrated silica.

10. Fertilizer materials comprising artificial calcium silicate wherein the ratio of calcium oxid to silica varies between two and one-half to one and seven-tenths to one.

11. Fertilizer materials in pulverulent form comprising artificial calcium silicate wherein the ratio of calcium oxid to silica varies between two and one-half to one and seven-tenths to one.

12. A fertilizer material in pulverulent form comprising calcium silicate wherein the ratio of calcium oxide to silica varies between two and one-half to one and seven-tenths to one, and containing impurities such as commonly occur in limestone and silica.

13. Fertilizer materials in pulverulent form comprising artificial calcium silicate wherein the ratio of calcium oxid to silica varies between two and one-half to one and seven-tenths to one, and containing potassium metal oxides and alumina as impurities.

14. The process of fertilization, which comprises subjecting the soil to a fertilizer composed of artificial calcium silicate, other than dicalcium silicate, the artificial silicate containing the ratio of calcium oxide to silica varying between two and a fraction to one and seven-tenths to one.

15. A fertilizer composed of artificially prepared calcium silicate other than dicalium silicate, of lower calcium content value than the tri-calcium and containing impurities such as zeolite material and iron oxide.

16. Fertilizer materials comprising artificial calcium silicate other than dicalcium silicate, wherein the ratio of calcium oxide to silica varies between two and one-half to one and seven-tenths to one.

17. Fertilizer materials in pulverulent form comprising artificial calcium silicate other than dicalcium silicate, wherein the ratio of calcium oxide to silica varies between two and one-half to one and seven-tenths to one.

18. A fertilizer material in pulverulent form comprising calcium silicate other than dicalcium silicate, wherein the ratio of calcium oxide to silica varies between two and one-half to one and seven-tenths to one, and containing impurities such as commonly occur in limestone and silica.

19. Fertilizer materials in pulverulent form comprising artificial calcium silicate other than dicalcium silicate, wherein the ratio of calcium oxid to silica varies between two and one-half to one and seven-tenths to one, and containing potassium metal oxides and alumina as impurities.

Signed at Sewaren in the county of Middlesex and State of New Jersey this 16 day of December A. D. 1918.

ALFRED HUTCHINSON COWLES.

Witnesses:
    ALFRED W. SCHEIDE,
    MARTIN KNOESEL.